(12) United States Patent
Vaman et al.

(10) Patent No.: US 6,426,941 B1
(45) Date of Patent: Jul. 30, 2002

(54) HITLESS ATM CELL TRANSPORT FOR RELIABLE MULTI-SERVICE PROVISIONING

(75) Inventors: Dhadesugoor R. Vaman, Frederick, MD (US); John H. Boal, Winchester (GB)

(73) Assignee: Megaxess, Inc., Germantown, MD (US)

( * ) Notice: Subject to any disclaimer, the term of this patent is extended or adjusted under 35 U.S.C. 154(b) by 0 days.

(21) Appl. No.: 09/249,001

(22) Filed: Feb. 12, 1999

(51) Int. Cl.[7] .................................................. H04J 3/00
(52) U.S. Cl. ...................................................... 370/228
(58) Field of Search ................................. 370/251, 228, 370/351, 395, 465, 468, 476, 506, 225, 227, 248, 395.1; 359/140

(56) References Cited

U.S. PATENT DOCUMENTS

| | | | | |
|---|---|---|---|---|
| 5,051,979 A | * | 9/1991 | Chaudhuri et al. | 370/506 |
| 5,577,196 A | * | 11/1996 | Peer | 714/4 |
| 5,631,896 A | * | 5/1997 | Kawase et al. | 370/228 |
| 5,809,129 A | * | 9/1998 | Andersson et al. | 370/220 |
| 6,075,767 A | * | 6/2000 | Sakamoto et al. | 370/228 |
| 6,044,065 A | * | 9/2000 | Andersson et al. | 370/506 |

* cited by examiner

Primary Examiner—Chau Nguyen
Assistant Examiner—Alexander O. Boakye
(74) Attorney, Agent, or Firm—Wolf & Samson

(57) ABSTRACT

Lossless delivery of an ATM cell based service over connection oriented multi-path networks is assured. The applicable network could be wired (to include optical fiber), or wireless, or a combination of these. A "queue" is added into the user information stream at the source node of the protection domain, and a working path receive queue is also introduced at the destination node. A low bandwidth sequence numbered (F3 like) OAM cell stream is carried cyclically from the source to the destination node over both the working and protection paths. A pre-determined delay of the sending of information over the network is employed. Upon an indication of an impairment of service, the delayed information is sent over a second path.

9 Claims, 3 Drawing Sheets

FUNCTIONAL ENTITIES REQUIRED TO REALIZE THE INVENTION.
NOTE "callouts" REFER TO THE DIFFERENTIAL DELAY DIAGRAM

REPRESENTATIVE TOPOLOGY OF AN ATM SUB-NETWORK

FUNCTIONAL ENTITIES REQUIRED TO REALIZE THE INVENTION.
NOTE "callouts" REFER TO THE DIFFERENTIAL DELAY DIAGRAM IN FIGURE 3

ILLUSTRATIVE DIFFERENTIAL AND QUEUING DELAYS VARIOUSLY
THROUGHOUT THE WORKING AND PROTECTION PATHS SHOWN IN FIGURE 2

HITLESS ATM CELL TRANSPORT FOR RELIABLE MULTI-SERVICE PROVISIONING

BACKGROUND OF THE INVENTION

1. Field of the Invention

The present invention relates to a method and apparatus by which lossless conveyance of user information can be achieved in an ATM network. The invention includes a protected bandwidth efficient network connection that can operate even using the bandwidth efficient 1:1 model while at the same time effecting a seamless (lossless or hitless) transition from the use of a working path to a protection path when a working path impairment occurs. A predetermined delay of the sending of information over the network is employed. Upon an indication of an impairment of service, the delayed information is sent over a second path.

2. Related Art

The International Telecommunications Union—Telecommunication Standardization Sector's current draft ITU-T I.630 Recommendation "ATM Protection Switching" has codified a set of four scenarios within which there are well defined specifications to assure high levels of, but not absolute continuity of, an ATM bearer service in spite of a wide variety of hard and soft OSI Physical layer impairments. Two pertinent inventions are known that have described the prior art pertaining to "ATM Protection Switching."

The first invention, entitled "Transparent Non-disruptible ATM Network" by Dhadesugoor R. Vaman, Tai Noh and J. Bose, U.S. patent application Ser. No. 08/862,631, filed May 23, 1997, now U.S. Pat. No. 6,011,780, relates to providing a high level of assurance for user services carried over an ATM sub-network. This level of assurance is maintained in the face of link and intermediate ATM switch failures as well as traffic congestion conditions that occur at intermediate network nodes or links between nodes.

The second invention, entitled "High Integrity Transport For Time Critical Multimedia Networking Application" by Dhadesugoor R. Vaman, Cadathur V. Chakravarthy and Kicheon Hong, U.S. patent application Ser. No. 08/945,453, filed Oct. 24, 1997, now U.S. Pat. No. 6,079,042, and U.S. patent Ser. No. 08/901,825 filed Jul. 28, 1997, now U.S. Pat. No. 5,993,056, relates to a method of transport that corrects errored cells and replaces missing cells in an integrated fashion with minimal overhead in sending the correction data.

These patent applications teach that although a solid failure (link or node) may occur within a sub-network, the techniques described therein can restore the bearer services that are provided by the sub-network with various degrees of temporary loss of service. The entire disclosures of these patents are expressly incorporated herein by reference.

It has been proposed to duplicate a simplex node to node physical link coupled with a transmitter that generates cell flows that are sent simultaneously to two Physical Media Dependent (PMD) link drivers. At receiving PMDs the two flows are recovered and synchronized by using the properties of F3 OAM cells, normally used for maintenance and performance monitoring of the physical link. These cells are specific to Cell-Based physical layers and are inserted in the cell flow on a cyclically recurrent basis. The user information stream may thus be seen as being "blocked" by these regular synchronizing F3 OAM delimiter cells. Synchronization at the cell level is essential to compensate for the length difference between the two physical links. Once this is achieved protection of user service is performed by selecting cell by cell (or block by block) those cells (or whole correct blocks) that are determined to have been correctly delivered by one or other of the two links.

This proposal is intended to be used exclusively over a simplex point to point link (but this scheme could be duplicated to support a duplex link). The proposal does not include a method for "hitless" communication over an end to end connection within an ITU-T I.630DR ATM Protection Switching domain as does the present invention.

While much of what is taught in the aforementioned patent applications has been codified within the ITU-T Draft Recommendation I.630—hereafter identified as I.630DR, ITU-T SG13 recognizes a need to further extend ATM's Protection Switching capabilities by an item in its "Living List" entitled "Hitless ATM" indicating that this is a field for farther study. The term "Hitless ATM" identifies a user service provision between connected source and destination nodes can be assured without even temporary loss of delivered information, despite the occurrence of various forms of bearer service impairments that affect ATM cell transit over any of the intermediate network connections.

OBJECTS AND SUMMARY OF THE INVENTION

A principal object of the present invention is the provision of an ATM network where data loss is prevented.

Another object of the present invention is the provision of a modified ATM network where loss of data is prevented on the occurrence of a fault in the transmission path from a transmitting node to a receiving node.

A still further object of the present invention is the provision of a delay in a data or information stream so that a delayed version of the data or information is always available in the event of a fault.

An additional object of the present invention is to provide a hitless ATM method wherein data is delayed and can be sent over a secondary path upon the indication of a network impairment.

Another object of the invention is the provision of a method and apparatus for assuring lossless delivery of data or information in both 1:1 and 1+1 network configurations.

The method and apparatus of the present invention is applicable in the scenario, identified as a "1:1" case where the "protection" or secondary path is not used until impairment in the working path is detected. Only then is it deemed appropriate to re-route the services carried by the working path onto the protection path to assure continued integrity of the user services provided.

The method and apparatus of the present invention is also applicable to the scenario identified as a "1+1" case where the source node transmits the user service concurrently over both the working and protection paths. When such a dual working and protection path connection is established only the information on the path designated as "working" is used at the destination node. However, when an impairment in the working path is detected the destination node switches to the use of the protection path information concurrently relayed to it thereby overcomes the absence or impairment of the working path in the user bearer service connection.

The present invention uses a point to point link only based hitless mechanism. The synchronization process is employed end to end across an I.630DR like protection domain. A "queue" is added into the user information stream at the source node of the protection domain, and a working path receive queue is also introduced at the destination node. Finally a low bandwidth sequence numbered (F3 like) OAM cell stream is carried cyclically from the source to the destination node over both the working and protection paths.

BRIEF DESCRIPTION OF THE DRAWINGS

The foregoing objects and advantages will become apparent to those skilled in the art from a review of the following detailed description of the invention, reference being made to the accompanying drawings in which.

DETAILED DESCRIPTION OF THE INVENTION

ITU-I.630DR characterizes two ATM protection switching domain scenarios. In both cases, when the working path for a service connection is established, an alternative protection path is also established. In a first scenario, identified as a "1:1" case, ITU-T SG13 Draft Recommendation I.630, August 1998 for approval in Febuary 1999, the "protection" path is not used until impairment in the working path is detected. Only then is it deemed appropriate to re-route the services carried by the working path onto the protection or secondary path to assure continued integrity of the user services provided.

Figure 1:
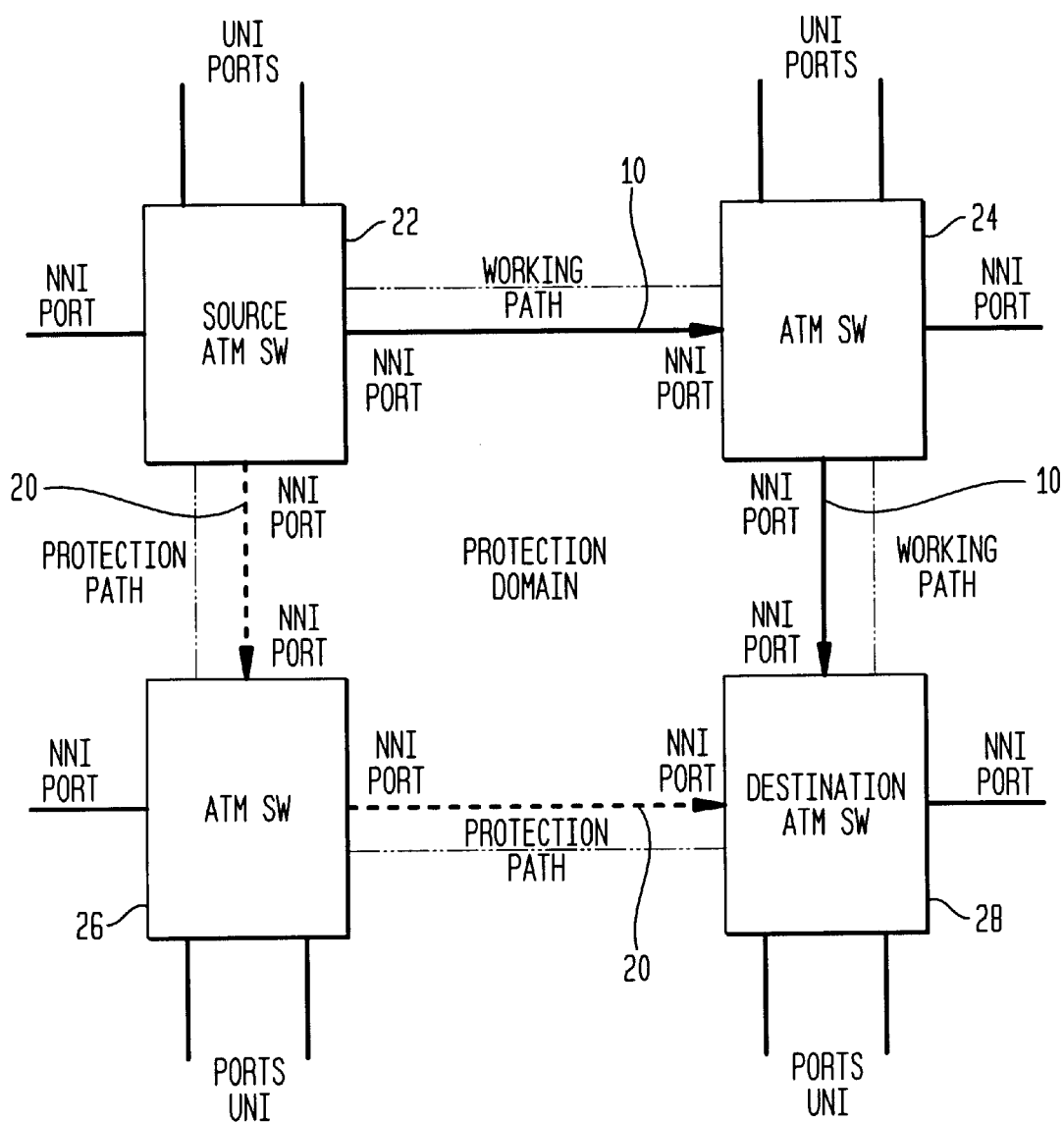
FIG. 1 is a diagram of a representative topology of an ATM network.

In the second scenario identified in I.630DR as a "1+1" case, the source node transmits the user service concurrently over both the working and protection or secondary paths. When such a dual working and protection path connection is established, only the information on the path designated as "working" is used at the destination node. However, when an impairment in the working path is detected, the destination node switches to the use of the protection path information concurrently relayed to it, thereby overcoming the absence or impairment of the working path in the user bearer service connection. FIG. 1 is a simple representation of working and protection path topologies, indicated at 10 and 20, respectively, applicable to both the "1+1" and "1:1" protection scenarios.

As shown in FIG. 1, four ATM switches are designated with the reference numerals 22, 24, 26 and 28. ATM SW 22 is the source and ATM SW 28 is the destination. The working path is established via ATM SW 24. The protection path is established via ATM SW 26.

A particular merit of the 1:1 strategy is that bandwidth available in the protection path is only used after an impairment is detected in the working path.

By contrast the great merit of the 1+1 model is that when an impairment occurs in the working path, the destination node path may use the protection path information more quickly than is the case with the 1:1 mode, thereby minimizing user service disruption.

While the 1:1 model in I.630DR has a longer "switching" time (i.e. to effect the change from the use of the established working path to the protection path) it is more frugal in its use of network bandwidth. The 1+1 model, which is able to switch more rapidly from the working to the protection path when working path impairments are detected, requires more expensive duplication of network bandwidth. This is due to its concurrent allocation of an equal amount of user service bandwidth over both the working path and the protection path—while the latter is only used when impairment is detected.

ATM bearer impairments fall into three sub-categories: link failure; node failure; and cell discard due to traffic congestion. This invention provides for the lossless conveyance of user information in all these circumstances. It also provides a protected bandwidth efficient network connection that can operate even using the bandwidth efficient 1:1 model while at the same time effecting a seamless (lossless or hitless) transition from the use of the working path to the protection path when a working path impairment occurs.

The present invention uses a point to point link only based hitless mechanism. The synchronization process is employed end to end across an I.630DR like protection domain. It is most effective in a modified form of the ITU-T's more bandwidth efficient 1:1 scheme but can be used also in a "1+1" scenario also. A "queue" is added into the user information stream at the source node of the protection domain, and a working path receive queue is also introduced at the destination node. Finally a low bandwidth sequence numbered (F3 like) OAM cell stream is carried cyclically from the source to the destination node over both the working and protection paths. In the following description only the more bandwidth efficient (and more complex) "1+1" scenario is described. The "1+1" model may be considered as a simple sub-set of what this teaches.

Figure 2:
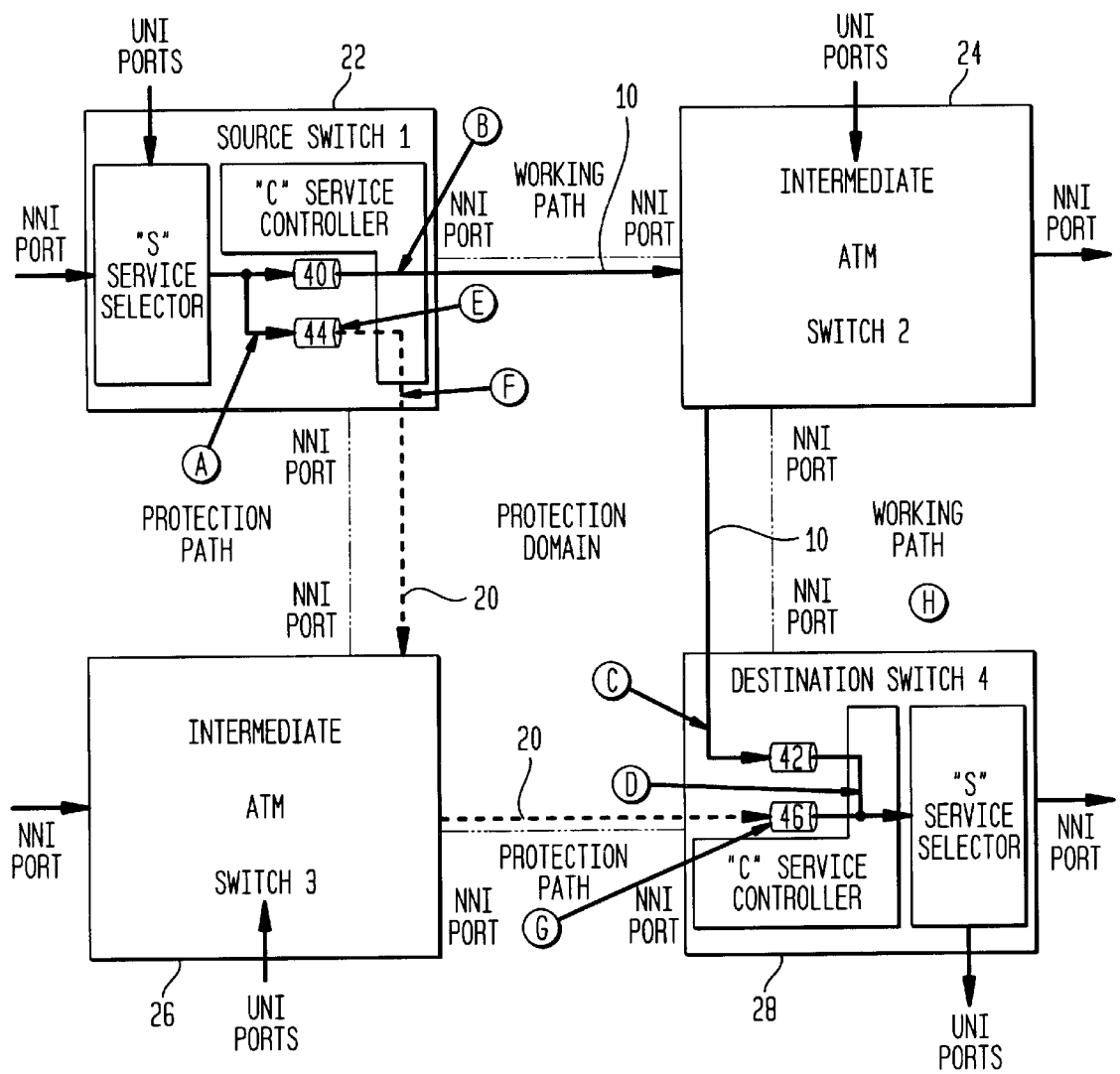
FIG. 2 is a diagram of the network configuration of FIG. 1 showing the differential delay configuration.

When two paths are identified for a "1:1" service connection, OAM synchronizing cell transmissions are sent over both the intended working and protection paths and provide both the source and destination nodes with path transit delay time information. The path with the higher transit delay is preferentially used as the working path, and the shorter path is assigned as a protection path. This is shown in FIG. 2, where the connection from Switch 1 (source) to Switch 4 (destination) via Switch 2 has been determined to be the longer path and is therefore used as a working path 10. The path from Switch 1 to Switch 4 (via Switch 3) is then assigned to be the alternate protection path 20.

In FIG. 2, two queues that are fundamental to the invention are shown. The queue 40 in switch 1 is the source node input queue for the connection. The queue 42 in switch 4 is the destination service output queue. When a protected domain connection is set-up between the source 22 and destination 28 the selected user service information is connected via the input selector "S" in the source node, and a similar destination node selector "S" that finally delivers the user information out of the protected domain.

By the incorporation of the queues 40 and 42, in the service path, the overall delay of the working path (switch 1→switch 2→switch 3) and the protection path (switch 1→switch 3→switch 4) can be deliberately controlled. The queue 40 in the working path ensures that the (working) service path has a longer delay than the protection path. The queue 44 in the protection path ensures that a "copy" of information sent over the working path is available for retransmission over the protection path when service switching is required.

During connection establishment a queue management process configures the queue sizes in 40, 42 and 44 such that a differential (working path plus queue 40 delay versus protection path) delay is created. The inherent differential delay between the working path 10 and the protection path 20 (due to cell propagation and relaying delays) is a function of the network configuration. The service connection management functions, that are resident in both the source and destination controllers "C"use the cyclic OAM cell transmissions from the source node to gain knowledge of the differential delay. Source switch controller "C" preferentially selects a longer path as a working path and the alternate shorter path as the protection path. For optimal network utilization, the queue management processes in the source and destination controllers "C" must also accommodate dynamic variation of the differential delays.

The queue sizes of 40 and 42 are established by the controller functions "C" in the source and destination nodes. They are set such that an OAM cell indication of an impairment in the working path can be sent upstream via the protection path faster than the total worst case cell transmission time over the working path. In particular before the buffered user information stream in the queue 44 pipeline is exhausted.

That is, the differential delay is computed as follows:
Differential delay>IDT(t)+MCP(t)
Where,
IDT=impairment Detection Time and
MCP=OAM Cell Processing time (via protection path) to effect the switch to protection path.

The sequence of events that must take place when a "1:1" working path impairment occurs is as follows:
1. A downstream entity in the working path detects impairment or loss of received signal, or an imminently unacceptable level of congestion.
2. The entity sends an OAM Alarm Indication Signal (AIS) downstream to the destination node 28 controller "C".
3. The destination controller forwards an OAM AIS cell upstream over the protection path 20 to the source node 22 controller entity "C".
4. The destination controller "C" optionally passes a "last good" cyclic sequence number field in the upstream OAM AIS cell.
5. The destination controller discards potentially defective user service information blocks in its output queue 42, that were received after the last good block was accepted from the now defective working path 10.
6. The destination controller "C" inhibits output of, or optionally moderates the output rate of, the buffered user service cells in its output queue 42.
7. The source controller "C" on receipt of the OAM AIS cell from the destination node (step 3 above) inhibits further transmission of user information over the (now defective) working path 10.
8. The source node controller "C" uses its knowledge of the differential delays (introduced by the path delays and assigned queue sizes) to identify the location in the source queue 44 of the first block of the buffered (copy) of the user information that it will retransmit over the protection path 20.
9. The source node controller may also use the "last good" cyclic block number optionally carried in the OAM AIS cell to select the start of retransmission data in step 7 above.
10. The source controller "C" retransmits potentially defective user service information downstream over the protection path 20 from user service blocks buffered in the source node queue 44.
11. On receipt of these retransmitted user service cells, sent now over the protection path 20, destination controller "C" starts to send or increases the output rate of buffered user cells in its now depleted output queue 42 until the pre-computed optimal queue size is reached.

Selection of a suitable user service blocking interval—the cyclic sequence numbering cell interval—coupled with a proper queue management system as described above can thus assure hitless user cell transmission in a "1:1" scenario without the need of additional (1+1) service bandwidth.

While this hitless methodology ensures that the logical integrity of the user service information stream can be assured, there will be temporal discontinuities in the user service delivery rate at the destination. By proper design of the queue sizes (40, 42 and 44) to make them specific to a particular requested user service cell rate, the degree of variance in the delivered user service cell rate can be controlled. The penalty for so doing is that the overall transit delays from source 22 to destination 28 is increased. For any particular service requirements and network configuration an optimal balance needs to be selected to limit the overall end to end user service delay.

In a 1+1 scenario, which demands more available network bandwidth, service queues (42 and 46) are only required at the destination node 28, although the insertion of the synchronizing OAM cell stream at the source node 22 must be retained. When an OAM AIS cell is received at the destination node 28, the node controller is able to switch seamlessly to the use of the protection path 20 user service stream. This 1+1 model has the advantage that it is less complex to implement. Also it uses minimal buffering, and thus has the least overall service transit delay, and it produces virtually no temporal discontinuities in the sequential delivery of user service cell. It is thus well suited to the conveyance of constant (or near constant) bit rate services, but at the expense of doubling the amount of network bandwidth allocation.

Figure 3:
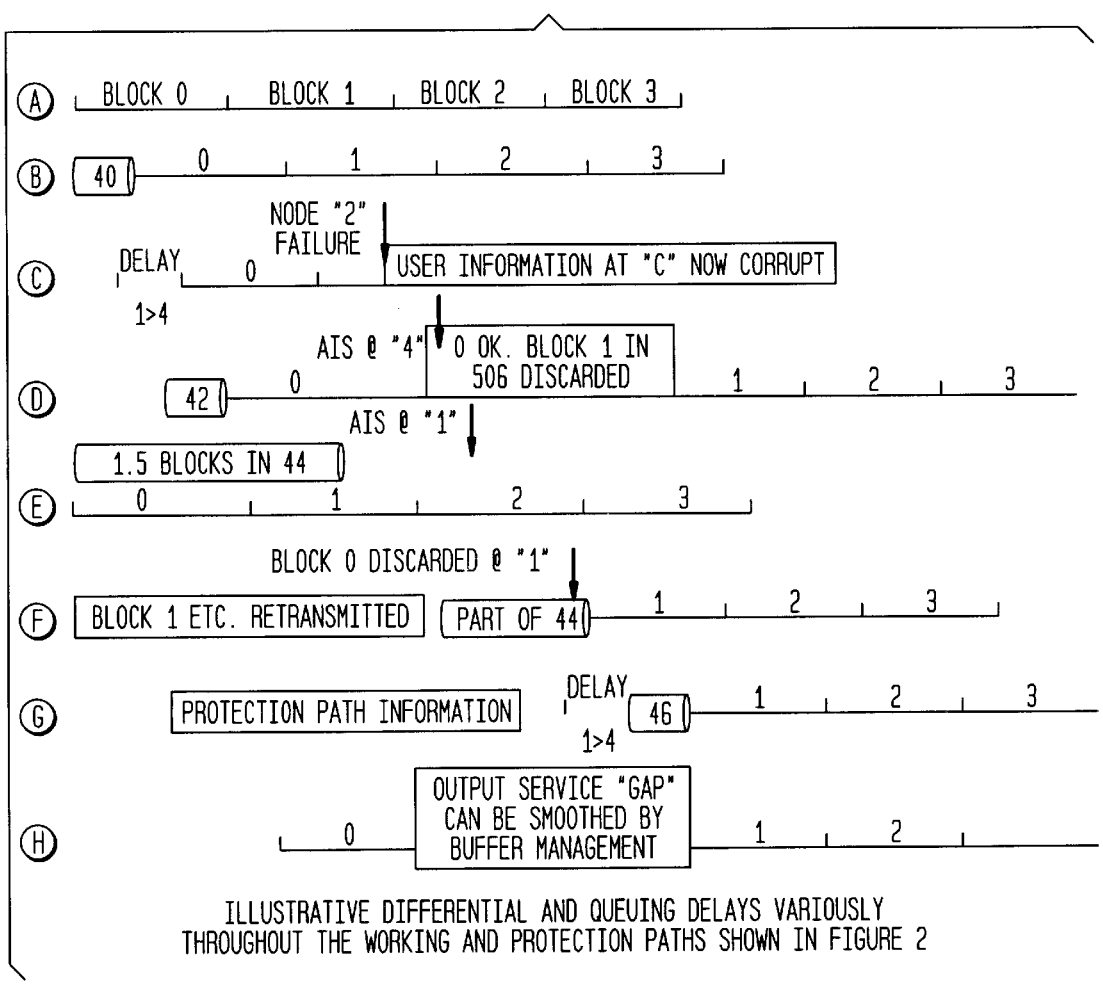
FIG. 3 illustrates the differential and queuing delays associated with the configuration shown in FIG. 2.

FIG. 3 illustrates the differential and queuing delays associated with the "1:1" scenario configuration shown in FIG. 2. Each of the letters A–H in FIG. 3 corresponds to the same letter designations in various portions of FIG. 2. Enabling the cells to go through a queuing delay (40 of FIG. 2), ensures that the working path has a longer delay than the protection path. This differential delay is required to signal to the source that switching of the working and protection paths is needed before the bounded contents of the buffered source queue 44 become depleted.

The queue management processes may also include cell queues in the intermediate switches of the working path to optimally configure differential delays.

With this 1:1 protection domain model no copy of the user information stream is carried on the protection path (unlike the 1+1 model). Only a low bandwidth sequence numbering OAM cell stream is copied over both paths to maintain synchronization of the protection and working paths at the destination node. This permits the destination node to maintain "alignment"—that is continuous synchronization—of the two channels.

When an impairment is detected in the working path the process of "protection" is effected in like manner to the I.630DR 1:1 method. In this method, the detection (downstream in the working path) of a protection triggering condition is signaled to the destination node using ATM OAM Alarm Indication Signal (AIS) cells. These are subsequently passed upstream by the destination node over the protection path to the source node. The detection of the AIS cell(s) at the destination node, combined with the working/protection path synchronization process, is used to suspend or moderate the rate of the onward delivery of the queued user cells at the destination node.

The detection of the relayed (by the destination node) AIS cell at the source node causes the source node to redirect the user service cells off the now defective working path, onto the protection path. Combined with the synchronization process this permits the source node to re-transmit from the beginning of the block those cells in the last "good" block as defined in the AIS cells received from the destination node block. When the destination node receives these re-transmitted user cells over the protection path the destination node is able to recommence the suspended (or reduced rate) onward conveyance of user information from the appropriate "block" boundary.

Seamless conveyance of a logically correct information stream can thus be assured. In the "1:1" model only the working path OR the protection path carries user information, not both. In a "1+1" scenario both paths still carry user information streams. In both cases it is true that both paths also carry a modest amount of synchronizing OAM cells, and there is a greater degree of temporal disruption of the user information stream. In most cases neither of these limitations are problematic, nor is the increase in functional complexity demanding. However in the "1:1" case, the freeing of the protection path from the burden of duplicated network bandwidth provision, effectively halves the normally expensive leasing or provision of network capacity.

In all the above descriptions the plurality of source and destination queues that have been identified may not exist in physically distinct forms. Within a single node the queues required need only exist in the form of a set of pointers and vectors into a common managed buffer space.

While the foregoing description represents preferred embodiments of the method and apparatus of the invention, it will be apparent to those skilled in the art that various changes and modifications may be made without departing from the spirit and scope of the invention as defined in the following claims.

What is claimed is:

1. A method of providing lossless delivery of user services carried by an ATM bearer service over a multi-path network comprising the steps of delaying information on said network by a queue having a size adjustable by a controller, the size being sufficient to permit an OAM cell to be sent upstream from a destination node to a source node before buffered information is exhausted, and transmitting said delayed information over a protection path on indication of an impairment in service on said network.

2. An apparatus for providing user service between connected source and destination nodes without loss of delivered information comprising:
   a source node for sending information;
   a destination node for receiving said information;
   differential delay means in said source node for delaying said information;
   means in said destination node for receiving said delayed information;
   multiple path means connected between said source node and said destination node, and control means connected to said source node and said destination node for sending said information over one of said multiple path means and for sending said delayed information from said source node to said destination node over another of said multiple path means; and
   synchronization means connected to said multiple path means for synchronizing information received at said destination node from said source node over said multiple path means.

3. The apparatus of claim 2 further including second differential delay means connected to said synchronization means for generating a plurality of different delay signals for said source node and said multiple path means based on a configuration of an underlying network.

4. A method of protecting an ATM network from data loss, said network having a source node, a destination node, one or more intermediate nodes, a working path and a protection path, the method comprising the steps of:
   providing differentially delayed information on said working path and on said protection path;
   detecting at said destination node a loss of received signal or an imminently unacceptable level of congestion in the working path;
   sending an alarm signal to said destination node;
   sending said alarm signal from said destination node to said source node over said protection path;
   passing the last good information to said destination node;
   discarding potentially defective information that was received after passing said last good information;
   inhibiting further transmission of information over said working path; and
   using differential delays, identifying the location of information for retransmission over said protection path.

5. A method for protecting an ATM network from data loss, the network including a source node, a destination node, and a working path and protection path, the method comprising:
   providing differentially delayed information on the working path and on the protection path;
   detecting along the working path an impairment of data;
   sending an alarm signal to the destination node;
   sending an alarm signal from the destination node to the source node; and
   using data transmitted over the protection path.

6. The method of claim 5 wherein the working path has a greater transmission delay than the protection path.

7. The method of claim 6 wherein the transmission delay of the working path and protection path is determined by an OAM cell sent over each path, the path with the higher delay being chosen as the working path.

8. The method of claim 7 further comprising queue means in the working path for assuring that the working path has a longer delay than the protection path.

9. The method of claim 5 wherein delayed data is retransmitted over the protection path.

* * * * *